US008295699B2

(12) United States Patent
Egorov et al.

(10) Patent No.: US 8,295,699 B2
(45) Date of Patent: Oct. 23, 2012

(54) PLASMON-ASSISTED WAVELENGTH-SELECTIVE SWITCH

(75) Inventors: Roman Egorov, Maynard, MA (US); Stuart Elby, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 485 days.

(21) Appl. No.: 12/648,025

(22) Filed: Dec. 28, 2009

(65) Prior Publication Data
US 2011/0158645 A1 Jun. 30, 2011

(51) Int. Cl.
*H04J 14/00* (2006.01)
(52) U.S. Cl. .............. 398/48; 398/45; 398/79
(58) Field of Classification Search .......... 398/48, 398/45, 43, 51, 54, 79, 82, 83, 84
See application file for complete search history.

(56) References Cited

U.S. PATENT DOCUMENTS

| | | | | |
|---|---|---|---|---|
| 6,282,005 B1 * | 8/2001 | Thompson et al. | ........... | 398/143 |
| 7,010,183 B2 * | 3/2006 | Estes et al. | ........... | 385/14 |
| 7,039,315 B2 * | 5/2006 | Blumberg et al. | ........... | 398/49 |
| 8,086,108 B2 * | 12/2011 | Tanigawa et al. | ........... | 398/135 |
| 8,135,277 B2 * | 3/2012 | Ham | ........... | 398/45 |
| 2008/0193133 A1 * | 8/2008 | Krug et al. | ........... | 398/83 |
| 2008/0212975 A1 * | 9/2008 | Burenkov | ........... | 398/140 |
| 2010/0129085 A1 * | 5/2010 | Smolyaninov et al. | ........ | 398/141 |
| 2011/0129183 A1 * | 6/2011 | Hyde et al. | ........... | 385/16 |

* cited by examiner

*Primary Examiner* — Mohammad R Sedighian

(57) ABSTRACT

A device may include a first optical port configured to receive an optical signal and a demultiplexer to spatially separate the optical signal into multiple optical signals. Each of the multiple optical signal may have a different carrier wavelength. The device may also include a switch element with plasmons. The switch element may receive one of the multiple optical signals, direct the received one of the multiple optical signals, and couple energy of the plasmons to energy of the directed optical signal. The device may further include a second optical port. The second optical port may receive the directed optical signal with the coupled energy of the plasmons, and transmit the received, directed optical signal.

20 Claims, 6 Drawing Sheets

PLASMON-ASSISTED WAVELENGTH-SELECTIVE SWITCH

BACKGROUND INFORMATION

In optical communications, a single optical fiber may convey signals at different wavelengths. Furthermore, via a wavelength-selective switch, it is possible to add or remove one or more carriers onto or from the optical fiber.

Today, there are three predominant technologies for switching beams of light within a wavelength selective switch (WSS). These technologies are based on using a micro-electromechanical system (MEMS) array, Liquid-Crystal-on-Silicon (LCOS) array, and Liquid Crystal (LC) elements array. Independently of the switching technology used within a WSS, the optical path of the beam of light in the WSS passes through a diffractive structure that implements channel demultuplexing before a switching function. A switching element (MEMS, LCOS, or LC) that implements the switching function directs each channel to a designated output port.

In a WSS that uses the LCOS, each of pixels (e.g., liquid crystal cells on a flat surface) in an array is electronically and individually controlled, in a manner analogous to that in which an individual element in a phased array antenna is controlled to change the phase of the signal reflected from an antenna element. Each antenna element contributes a coherent component of far-field signal in a particular direction. With each liquid crystal cell acting analogous to a phase-changing antenna element, a LCOS device can steer beams in optical frequencies.

DETAILED DESCRIPTION OF PREFERRED EMBODIMENTS

The following detailed description refers to the accompanying drawings. The same reference numbers in different drawings may identify the same or similar elements.

As described below, a wavelength-selective switch may include gratings and surface plasmons. Upon receiving an input signal, the wavelength-selective switch may demultiplex the signal into coherent beams of different wavelengths. Furthermore, the gratings may steer the coherent beams in selected combinations to output ports. Because the energy of the plasmons may be coupled to that of the beams, the wavelength-selective switch may reduce or minimize any insertion loss in processing the input signal.

Figure 1:
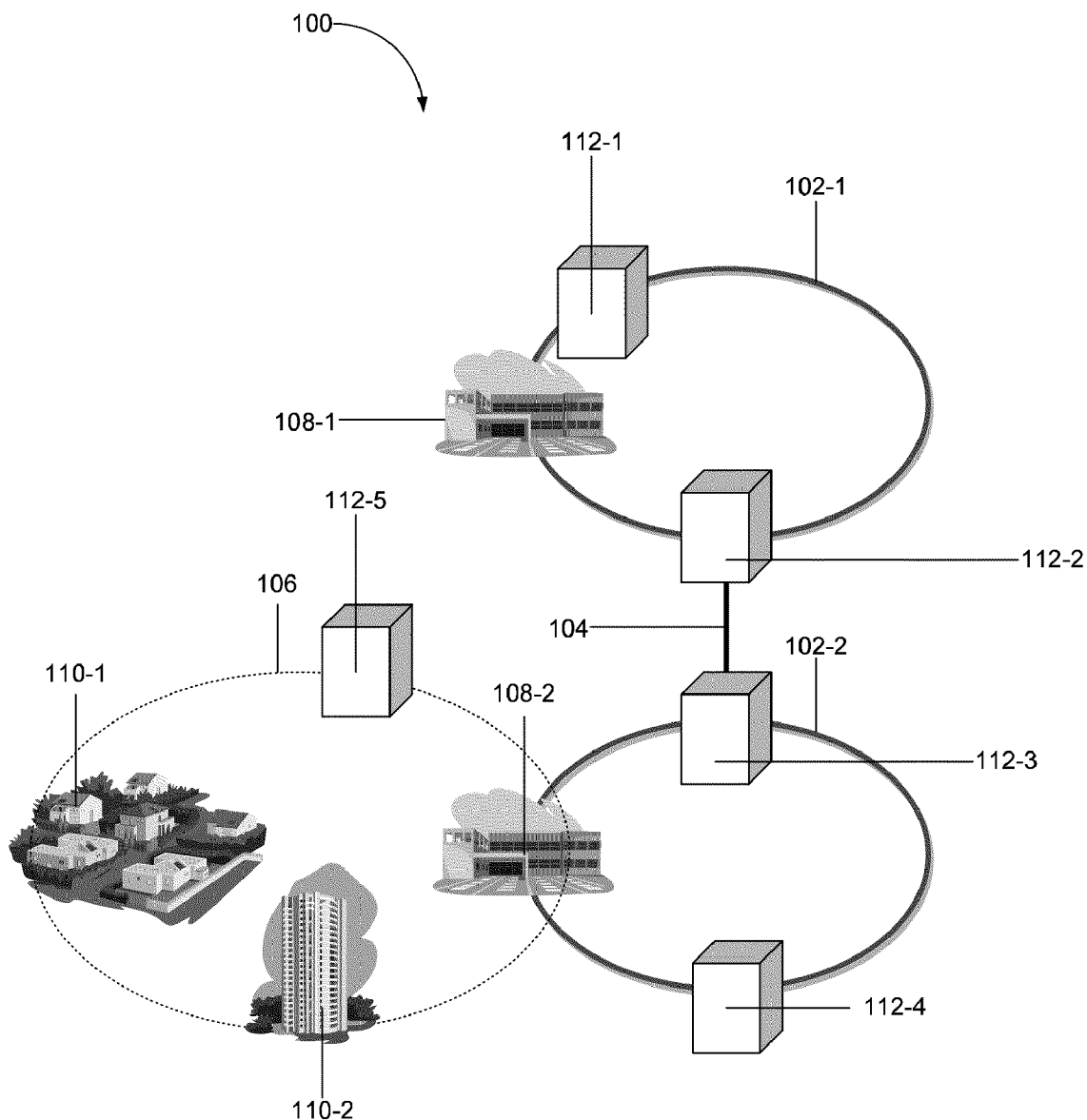
FIG. 1 illustrates an exemplary optical network in which concepts described herein may be implemented.

FIG. 1 shows an exemplary optical network 100 in which the concepts described herein may be implemented. As shown, optical network 100 may include metro/regional networks 102-1 and 102-2, long haul or ultra-long haul optical lines 104, and edge network 106. Depending on the implementation, optical network 100 may include may include additional, fewer, or a different configuration of optical networks and optical lines than those illustrated in FIG. 1. For example, in one implementation, optical network 100 may include additional edge networks and/or metro/regional networks that are interconnected by Synchronous Optical Network (SONET) rings.

Metro/regional network 102-1 may include optical fibers and central office hubs that are interconnected by the optical fibers. The central office hubs, one of which is illustrated as central office hub 108-1, may include sites that house telecommunication equipment, including switches, optical line terminals, etc. In addition to being connected to other central offices, central office hub 108-1 may provide telecommunication services to subscribers, such as telephone service, access to the Internet, cable television programs, etc., via optical line terminals. Metro/regional network 102-2 may include similar components as metro/regional network 102-1 and may operate similarly. In FIG. 1, metro/regional network 102-2 is illustrated as including central office hub 108-2, which may include similar components as central office hub 108-1 and may operate similarly. Long haul optical lines 104 may include optical fibers that extend from metro/regional optical network 102-1 to metro/regional optical network 102-2.

Edge network 106 may include optical networks that provide user access to metro/regional optical network 102-2. As shown in FIG. 1, edge network 106 may include access points 110-1 and 110-2 (e.g., office buildings, residential area, etc.) via which end customers may obtain communication services from central office hub 108-2.

In FIG. 1, networks 102-1, 102-2, 104, and 106 may include reconfigurable optical add-drop multiplexers (ROADMs) 112-1 through 112-5 (collectively "ROADMs 112" and individually "ROADM 112-x"). Each ROADM 112-x may add or drop optical signals of particular wavelengths to/from the network and provide for part of wavelength division multiplexing (WDM) in network 100. The configuration of ROADMs 112 may be controlled remotely (e.g., from central office hub 112-1). In some implementations, ROADM 112-x may include plasmon-assisted (PA) wavelength-selective switches. As used herein, the term "plasmon-assisted (PA) wavelength selective switch" may refer to a wavelength selective switch in which the power of generated plasmon is coupled back to an output optical wave, potentially significantly decreasing insertion loss of the wavelength selective switch. The grating structure in a switch element through which the plasmons propagate can be programmed or reprogrammed to direct the output beam to a particular output port.

Figure 2A:
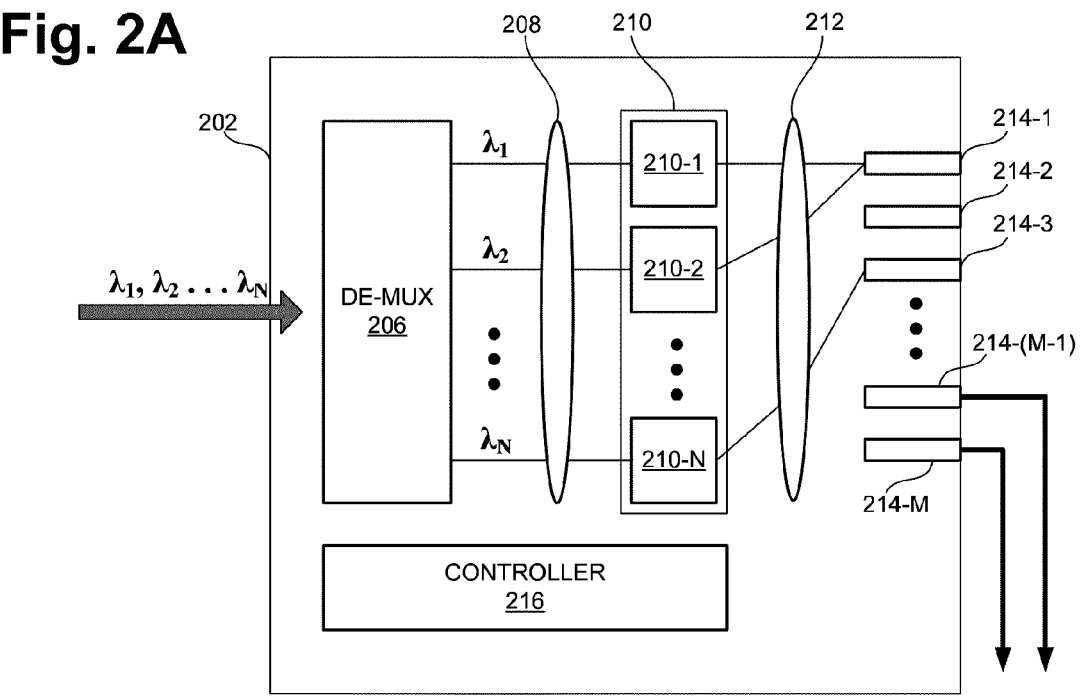
FIGS. 2A and 2B are diagrams of exemplary components of a reconfigurable optical add-drop multiplexer of FIG. 1.
Figure 2B:
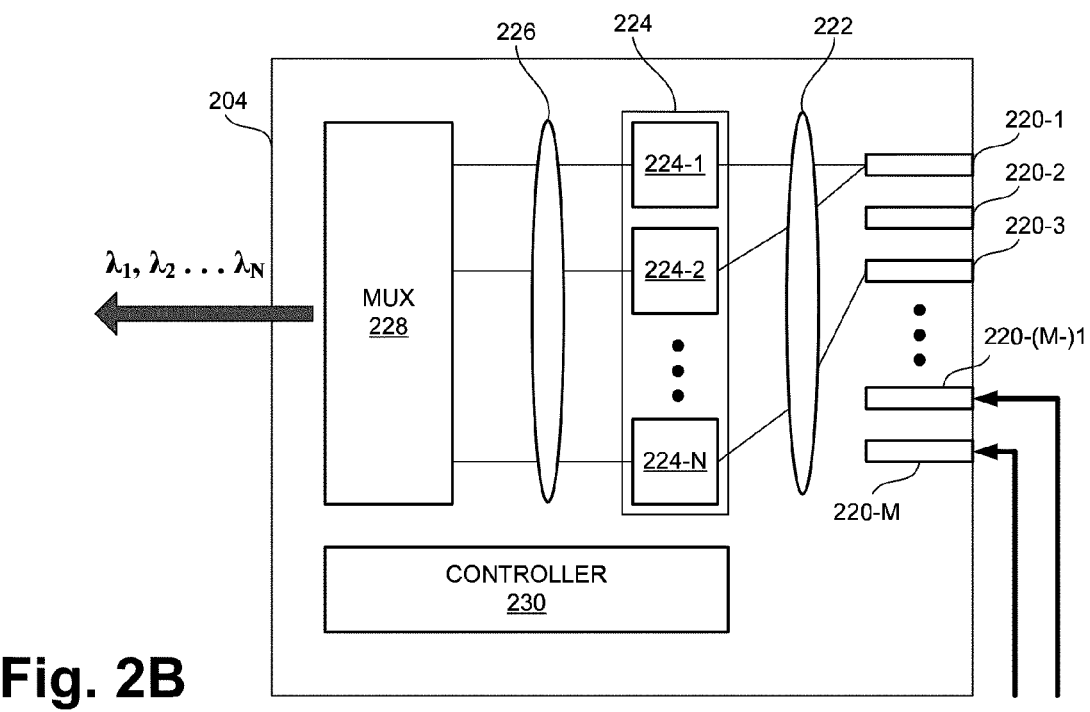

FIGS. 2A and 2B are diagrams of exemplary components of PA wavelength-selective switches of ROADM 112-x. FIG. 2A illustrates PA wavelength-selective switch 202. As shown in FIG. 2A, PA wavelength-selective switch 202 may include a demultiplexer 206, lens 208, switch array 210, lens 212, output ports 214-1 through 214-M (collectively "output ports 214" and individually "output port 214-x"), and controller 216.

Depending on the implementation, PA wavelength-selective switch 202 may include additional, fewer, or different arrangement of components than those illustrated in FIG. 2A. For example, in one implementation, PA wavelength-selective switch 202 may include collimators between demultiplexer 206 and lens 208, or collimators between lens 212 and output ports 214. In another example, in a different implementation, PA wavelength-selective switch 202 may provide different internal geometry to employ a single lens in place of lenses 208 and 210.

Demultiplexer 206 may receive an input beam and spatially separate the input beam into beams of different wavelengths. For example, demultiplexer 206 may separate a white beam into red, green, and blue beams. Lens 208 may focus each of the beams of different wavelengths from demultiplexer 206 onto switch array 210.

Switch array 210 may include switch elements 210-1 through 210-N (collectively "switch elements 210" and individually "switch element 210-$x$"). Each switch element 210-$x$ may receive an input beam of a particular wavelength and direct the beam to one of output ports 214-1 through 214-M. By controlling switch elements 210, PA wavelength-selective switch 202 may select output beams of particular wavelengths and direct the beams to specific output ports 214.

Lens 212 may focus each of the beams from switch array 210 into output ports 214. Output port 214-$x$ may receive a combination of selected beams of particular wavelengths from switch elements 210 and output the combination of beams. Controller 216 may configure switch elements 210 (e.g., configure switch element 210-$x$ to direct a beam to a particular output port 214-$x$). Furthermore, controller 216 may communicate with an external device in configuring PA wavelength-selective switch 202.

FIG. 2B illustrates PA wavelength-selective switch 204. PA wavelength-selective switch 204 may include components that correspond to the components of PA wavelength-selective switch 202. However, in PA wavelength-selective switch 204, optical signals flow in the reverse direction of the optical signals in PA wavelength-selective switch 202 illustrated in FIG. 2A.

As shown, PA wavelength-selective switch 204 may include input ports 220, lens 222, switch array 224, lens 226, multiplexer 228, and controller 230. As in the case of PA wavelength-selective switch 202, PA wavelength-selective switch 204 may include additional, fewer, or different components than those illustrated in FIG. 2B.

Input ports 220 may receive optical beams/signals and direct them to switch elements 224 in switch array 224. Lens 222 may focus each of the beams from input ports 220 onto switch array 224. Each switch element 224-$x$ may receive an input beam from input ports 220 and direct the beam to multiplexer 228. Lens 226 may focus the beams from switch array 224 onto multiplexer 228. Multiplexer 228 may combine the beams of different wavelengths from switch array 224 and output them as an optical beam from PA wavelength-selective switch 204. Controller 230 may control/configure switch elements 224. Furthermore, controllers 230 may communicate with an external device in configuring PA wavelength-selective switch 204.

In ROADM 112-$x$, PA wavelength-selective switch 202 may operate in conjunction with PA wavelength-selective switch 204. In such an implementation, each of output ports 214 may be connected to each of input ports 220, except for a number of output ports (e.g., output ports 214-(M−1) and 214-M) and input ports (e.g., input ports 220-(M−1) and 220-M) via which beams of specific wavelengths may be added and/or dropped from the beam that travels from the input of demultiplexer 206 to the output of multiplexer 228. That is, as optical signals at different wavelengths propagate through ROADM 112-$x$, selected optical signals at particular wavelengths may be added or dropped via a number of input ports 220 and output ports 214.

Figure 3:
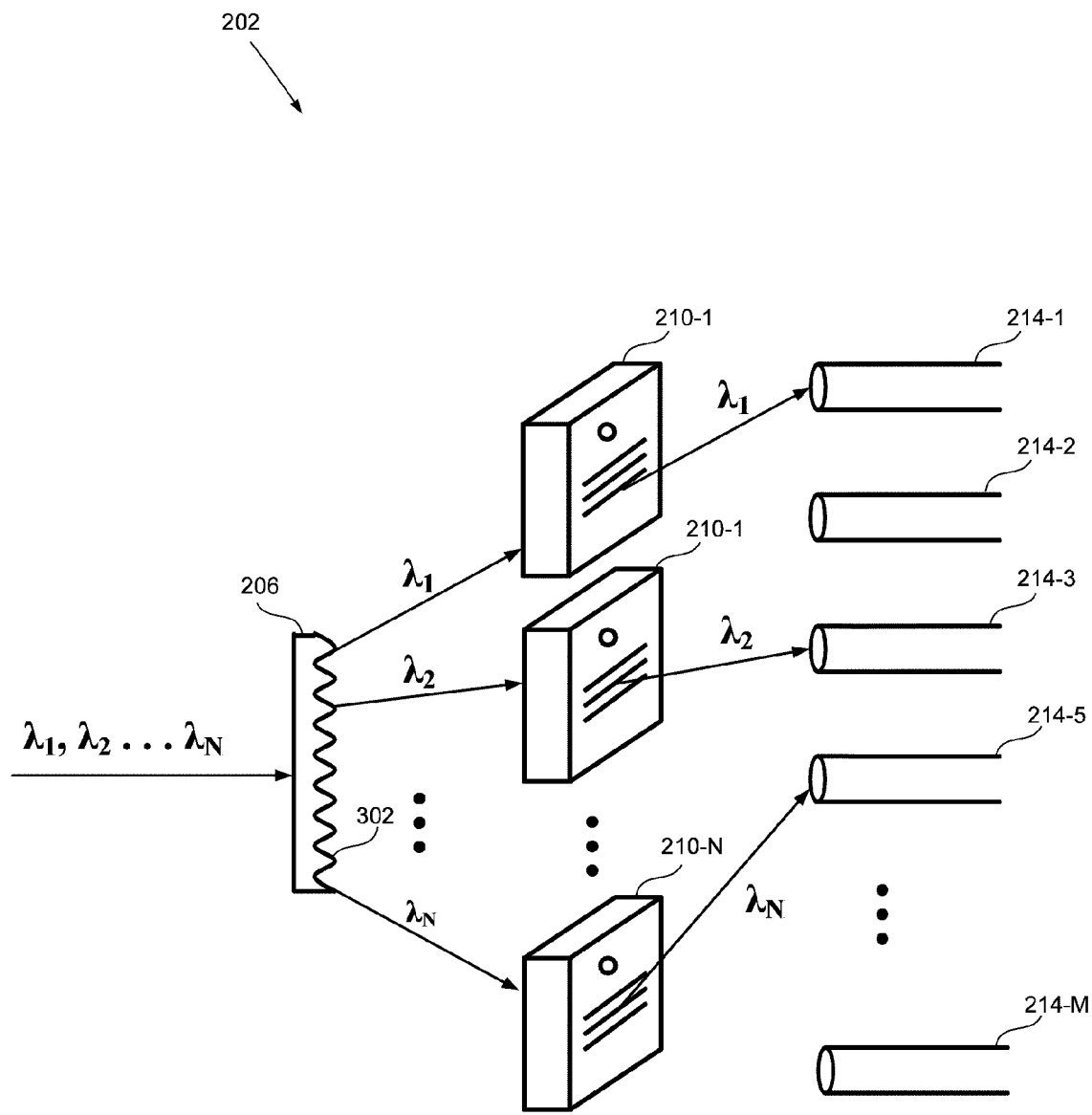
FIG. 3 is a diagram of an exemplary plasmon-assisted wavelength-selective switch of FIG. 2A.

FIG. 3 is a diagram of an exemplary PA wavelength-selective switch 202. For the purpose of simplicity and ease of understanding, FIG. 3 does not show some of the components of FIG. 2A. As shown in FIG. 3, multiplexer 206 of PA wavelength-selective switch 202 may include a diffraction grating 302. Diffraction grating 302 may scatter an input optical beam into beams of different wavelengths $\lambda_1, \lambda_2 \ldots,$ and $\lambda_N$. Each of the diffracted beams may be directed to a corresponding switch element 210-$x$.

As further shown, each switch element 210-$x$ may diffract a beam of light around particular wavelength $\lambda_x$ to output port 214-$y$. Accordingly, each output port 214-$x$ may carry a signal that is a combination of beams from different switch elements 210.

Figure 4:
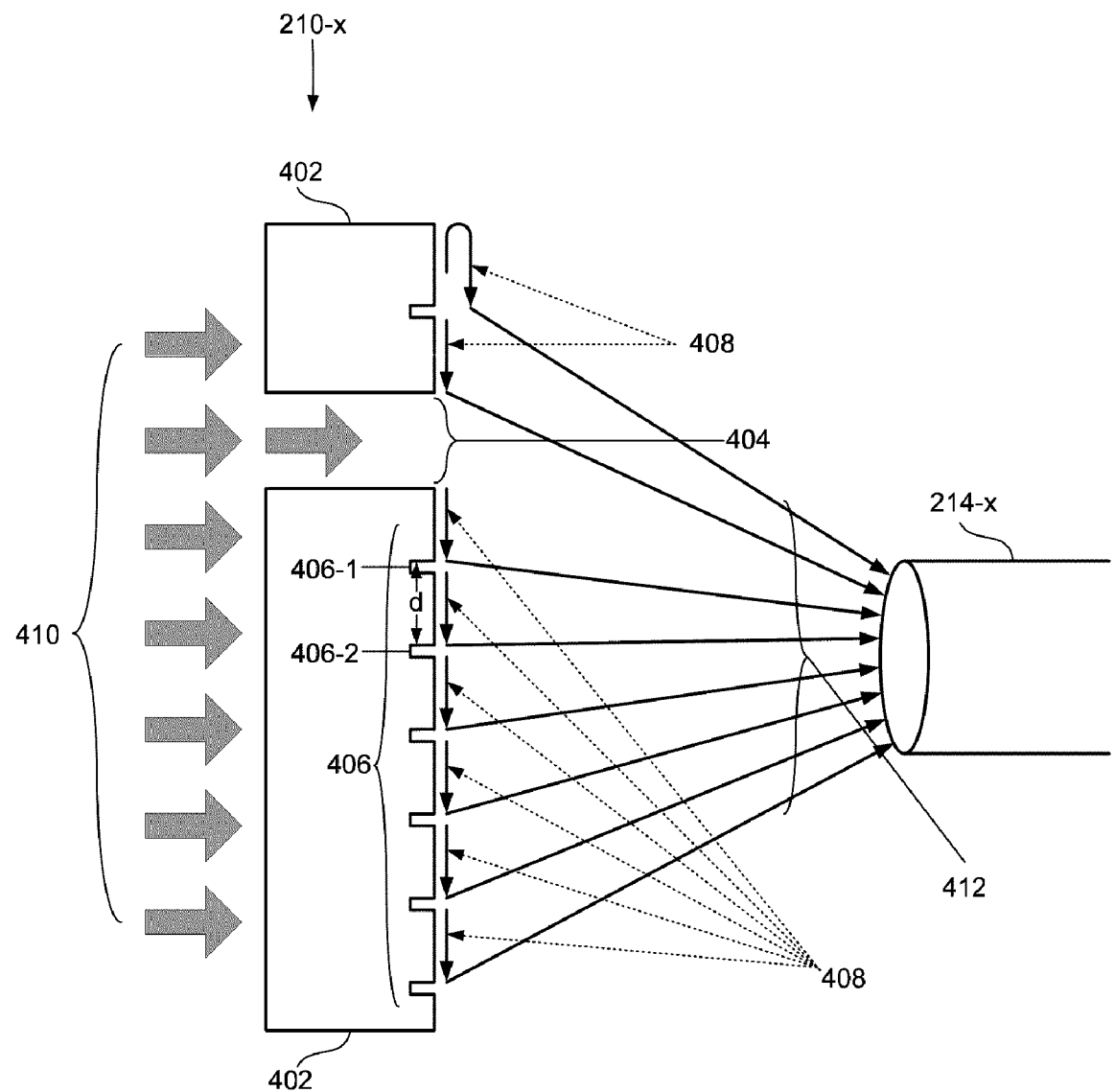
FIG. 4 is a diagram of an exemplary switch element of FIG. 3 in one configuration.

FIG. 4 is a diagram of switch element 210-$x$ in one configuration. As shown, switch element 210-$x$ may include a body 402, with an aperture 404 and a grating structure 406 on a surface facing away from incident beam 410. Depending on the implementation, switch element 210-$x$ may include additional or different components (e.g., electrical contacts, mechanical structures, etc.).

Body 402 may be made of metal or semiconductor (e.g., indium antimonide (InSb)). In some implementations, body 402 may transmit some of incident beam 410 and allow the transmitting beam to interact with grating structure 406. Aperture 404 may include space via which a portion of beam 410 may be sent through body 402.

Grating structure 406 may include grooves, micro-electro-mechanical systems (MEMS) structures, and/or other types of grating elements (e.g., grating elements 406-1 and 406-2) that guide incident beam 410 into diffracted beam 412 in accordance with signals/instructions from controller 216. In an implementation where the spatial geometry of the components in wavelength-selective switch 202 is different than that illustrated in FIG. 4, incident beam 410 may hit grating structure 406 from the front, rather than from the back (FIG. 5).

Grating elements 406-1 and 406-2 (or other grating elements not labeled in FIG. 4) in grating structure 406 may be sufficiently spaced apart (e.g., distance d) to allow plasmons 408 to exist there between. The term "plasmon," as used herein, includes a unit or quantum of resonant oscillation in electron density in body 402. As shown in FIG. 4, plasmons 408 may be localized or confined at or near the surface of body 402 (e.g., surface plasmons). Typically, plasmons 408 may be created by the interaction between electromagnetic field/electrons and metal surface (e.g., a surface on body 402). That is, plasmons 408 may be generated or induced via electron injection or incident light from another component (not shown) to body 402.

In the configuration illustrated in FIG. 4, because the energy of plasmons 408 may couple with the energy of diffracted beam 412, PA wavelength-selective switch 202 may incur small or no insertion loss.

Figure 5:
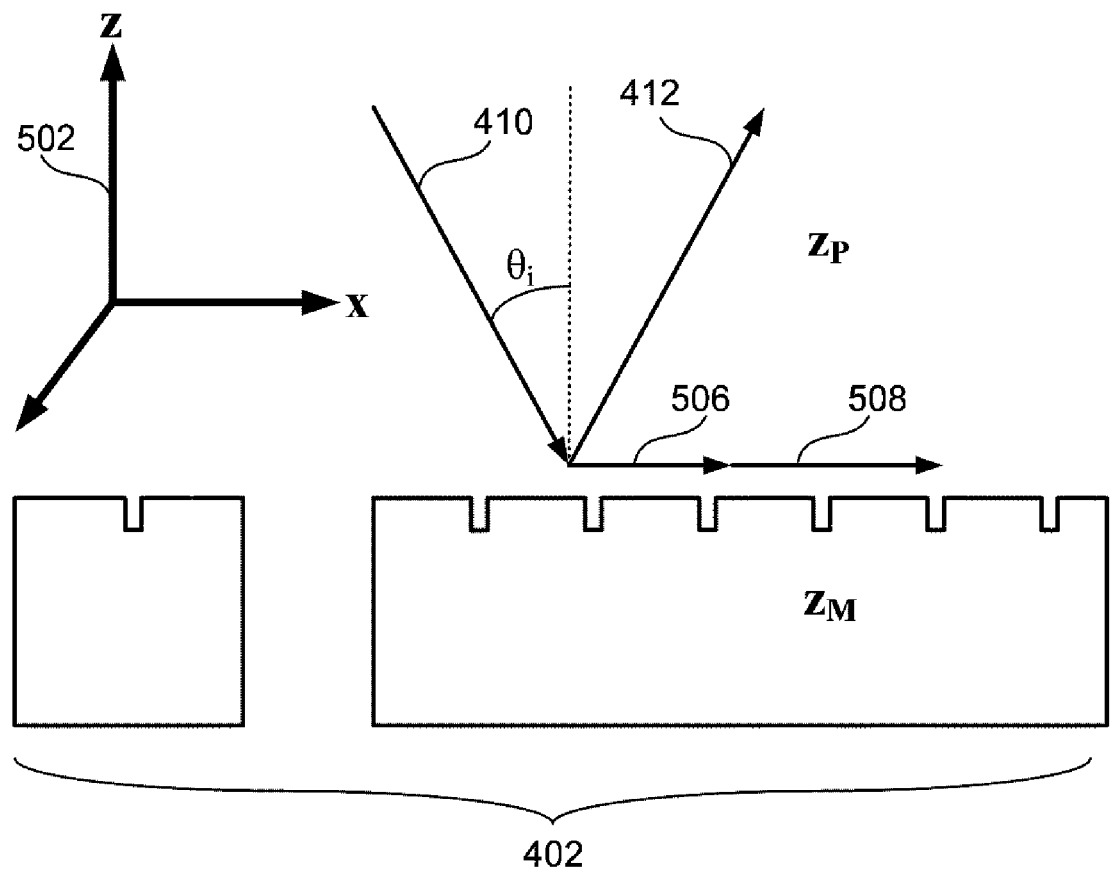
FIG. 5 illustrates the switching element of FIG. 3 in another configuration.

FIG. 5 illustrates switching element 210-$x$ in another configuration. Due to the different arrangement (not shown) of components in PA wavelength selective switch 202 (e.g., lens, mirrors, etc.), beam 410 in FIG. 5 is incident on body 402 from the front, rather than from the back as illustrated in FIG. 4.

In addition, FIG. 5 illustrates coupling between beams and plasmons 408 via grating structure 406. The coupling relationship between plasmons 408 and beam 412 illustrates effects of modifying the periodicity of grating structure 406 and angle of incidence $\theta_i$ for steering diffracted beam 412.

To obtain an expression approximating the coupling, it may be useful to obtain an expression for the wave number $k_s$ for plasmons 408. Assume that body 402 is oriented in accordance with coordinate axis 502, and that far-field beams in an area facing the front surface of body 402 include diffracted beam 412. Assuming that the far-field beams are described by the real part of complex electromagnetic wave $E_C$, it is possible to write, $E_C=E_0\exp(i\ (k_x x+k_z z-\omega t))$, where $E_0$ is the magnitude of the wave, $k_x$ is the wave number in x-axis, $k_z$ is the wave number in the z-axis, and $\omega$ is the frequency. In addition, assume that grating structure 406 on the surface of body 402 is a sinusoid of a single period. Matching boundary conditions at areas $z_p$ and $z_M$, the dispersion relation for $k_s$ on the surface of body 402 becomes:

$$k_s = k_x \sin\theta_i \pm 2\pi m/d = (\omega/c)\sin\theta_i \pm 2\pi m/d_j \quad (2)$$

In expression (2), $k_x$ is the wave number of beams in region $z_p$, $\theta_i$ is the angle of incidence, m is an integer, and $d_j$ is the period of $j^{th}$ Fourier component of groove structure 406. The overall effect of groove structure 406 can be obtained by summing up expression (2) over different Fourier components of groove structure 406:

$$k_s = k_x\sin\theta_i \pm 2\pi m/d = (\omega/c)\sin\theta_i \pm \sum_j 2\pi m/d_j \quad (3)$$

Given expression (3), it is possible to determine a coupling between plasmons 410 and diffracted beam 412. Assume that T is a transmission function, $\Omega$ is a solid angle over which intensity of diffracted is to be determined, I is the intensity of diffracted beam 412, $I_0$ is the intensity of incident beam 410, S is a Fourier transform of a Gaussian correlation function, and $W^2$ is a radiation pattern from a single dipole at body 402/dielectric (e.g., air) interface. Each of T, S, and W may depend on angle $\theta_i$, $k_s$, dielectric functions/constants in body 402 and in $z_p$. Then, it is possible to write:

$$(1/I_0)dI/d\Omega=(1/4)(\omega/c)^4|S|^2|T|^2|W(\theta_i)|^2 \quad (4).$$

Expression (4) illustrates the coupling relationship between each of plasmons 408 and beams 412 and how modifying the width d between grooves in grating structure 406 (e.g., the period of grating structure 406) and/or other device parameters may steer diffracted beam 412 in a particular direction. Although additional refinements may be made to expression (4), they are not described here for the purpose of simplicity and ease of understanding.

Figure 6:
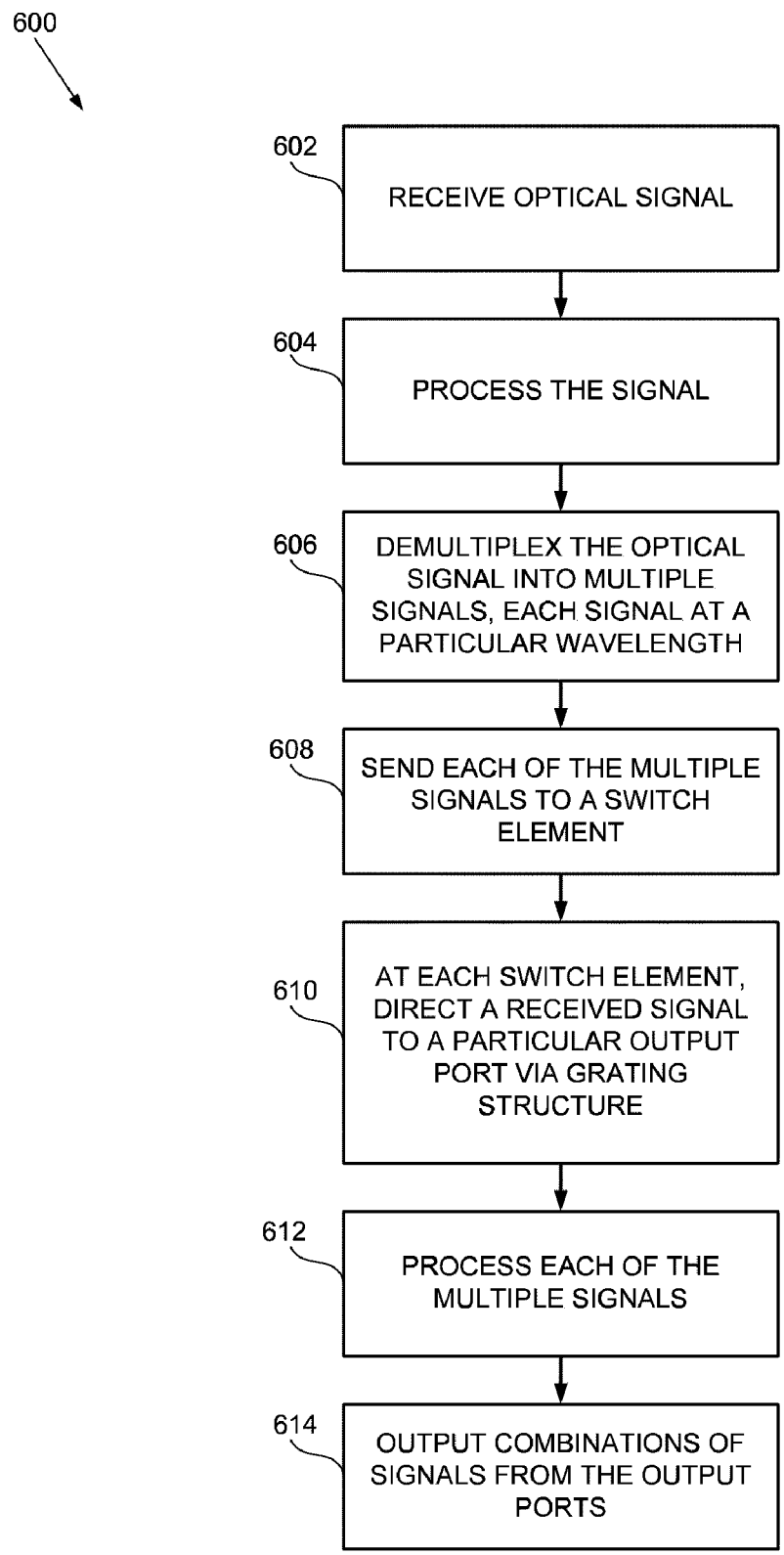
FIG. 6 is a flow diagram of an exemplary process for operating the plasmon-assisted wavelength-selective switch of FIG. 2A.

FIG. 6 is a flow diagram of an exemplary process 600 that is associated with operation of PA wavelength-selective switch 202. Processing 600 may include receiving an optical signal at an input port of demultiplexer 208 (block 602). In some implementations, PA wavelength-selective switch 202 may process the signal (e.g., focus the signal via lens 208, collimate the signal, etc.) (block 604).

PA wavelength-selective switch 202 may demultiplex the optical signal into multiple signals (block 606). In one implementation, demultiplexer 208 may include diffraction grating (e.g., diffraction grating 302) that separates the optical signal into multiple optical signals at different wavelengths.

Each of the multiple signals may be guided to switch element 210-x (block 608). In some implementations, directing the multiple signals may require additional processing (e.g., via lens, mirror, etc.).

Switch element 210-x may direct a received optical beam from demultiplexer 206 to a particular output port 214-x (block 610). Directing the received optical beam may include changing the period of grating structure 406 (e.g., reprogramming) or reconfiguring MEMS structures in switch element 210-x via controller 216. This may modify both the direction of the beam as well as the degree to which plasmons 408 are coupled to beams 412. As the consequence of switch elements 210 directing the multiple optical signals, each output port 214-x may receive a combination of the optical signals at different carrier wavelengths from one or more switch elements 214.

PA wavelength-selective switch 202 may process the optical signals from switch elements 210 (block 612). As described, above, processing the optical signals may include further focusing/defocusing, collimating, etc. PA wavelength-selective switch 202 may output the processed optical signals from output ports 214 (block 614). One or more of optical signals that are received at one of output ports 214 may be dropped by PA wavelength-selective switch 202.

In process 600, PA wavelength-selective switch 202 may demultiplex an optical signal into multiple optical signals, drop one or more of the multiple signals at specific wavelengths, and output the remaining multiple optical signals. In contrast, PA wavelength-selective switch 204 may perform a process that is the reverse of process 600 (e.g., receive multiple optical signals), add one or more signals at specific wavelengths, and multiplex the multiple signals and the added signals into one optical signal.

In manipulating the beams within, PA wavelength-selective switches 202 and 204 may steer coherent beams via grating structure 406 in switch elements 214/224. In PA wavelength-selective switch 202, grating structure 406 in switch element 210-x may steer coherent beams to output ports 214. In PA wavelength-selective switch 204, grating structure 206 may receive coherent beams from input ports 220. In PA wavelength-selective switches 202 and 204, because the energy of plasmon 408 is coupled to the beams, using PA wavelength-selective switch 202/204 may reduce or minimize an insertion loss in processing the input signal.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Furthermore, while a series of blocks have been described with regard to the process illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:
1. A device comprising:
a first optical port configured to receive an optical signal;

a demultiplexer to spatially separate the optical signal into multiple optical signals, each of the multiple optical signal having a different carrier wavelength;
a switch element including plasmons, configured to:
receive one of the multiple optical signals,
direct the received one of the multiple optical signals, and
couple energy of the plasmons to energy of the directed optical signal; and
a second optical port to:
receive the directed optical signal with the coupled energy of the plasmons, and
transmit the received, directed optical signal.

2. The device of claim 1, wherein the switch element includes:
a grating for directing the received one of the multiple optical signals.

3. The device of claim 2, wherein the grating includes one of:
a micro-electromechanical system (MEMS) structure for directing the received one of the multiple optical signals; or
grating elements with variable spacing between the grating elements.

4. The device of claim 1, wherein the switch element includes:
a body comprising indium antimonide.

5. The device of claim 1, wherein the device includes:
an aperture for transmitting some of the received one of the multiple optical signals.

6. The device of claim 1, wherein the device includes:
a collimator at the second optical port.

7. The device of claim 1, further comprising:
a lens to focus the one of the multiple optical signals onto the switch element.

8. The device of claim 1, further comprising one or components to:
send electrons to the switch element for creating the plasmons; or
guide an optical signal to the switch element to induce the plasmons.

9. The device of claim 1, wherein the demultiplexer includes:
a diffraction grating.

10. The device of claim 9, further comprising:
a multiplexer for combining the transmitted optical signal at the second optical port with other optical signals at other optical ports; and
an output port for transmitting the combined optical signals.

11. A method comprising:
receiving an optical signal;
spatially demultiplexing the optical signal into multiple optical signals, each of the multiple optical signals having a different carrier wavelength;
receiving each of the multiple optical signals at a corresponding switch element;
directing each of the multiple optical signals at the corresponding switch element;
coupling, at each of the switch elements, energy of the directed optical signal to energy of surface plasmons on a body of the switch element;
receiving the directed optical signals at ports, each of the directed optical signals having the coupled energy; and
transmitting the received, directed optical signal from each of the ports.

12. The method of claim 11, wherein directing each of the multiple optical signals includes:
diffracting one or more of the multiple optical signals.

13. The method of claim 12, wherein diffracting further comprises at least one of:
varying spacing between grating elements for diffracting the one or more of the multiple optical signals; or
changing a setting on a micro-electromechanical system (MEMS) structure for directing the one or more of the multiple optical signals.

14. The method of claim 12, further comprising:
generating the surface plasmons on the body of the switch element.

15. The method of claim 11, further comprising:
collimating the received, directed optical signals at the ports.

16. The method of claim 11, wherein spatially demultiplexing the optical signal includes:
diffracting the optical signal.

17. The method of claim 11, further comprising:
focusing each of the multiple optical signals onto the corresponding switch element.

18. The method of claim 11, further comprising:
multiplexing the received, directed optical signal from each of the ports to output a single optical signal; and
outputting the multiplexed signal.

19. A method comprising:
means for receiving optical signals of different wavelengths at input optical ports;
means for directing and sending, to each of multiple switch elements, optical signals of a same wavelength from the input optical ports;
means for coupling, at each of the switch elements, energy of the optical signals of the same wavelength to energy of surface plasmons on a body of the switch element;
means for sending the optical signals at each of the switch elements to a multiplexer;
the multiplexer for combining the optical signals from the switch elements; and
means for transmitting the multiplexed optical signals.

20. The method of claim 19, wherein the means for directing includes:
means for changing spacing between grating elements for diffracting the optical signals of the same wavelength.

* * * * *